United States Patent [19]

Fuss

[11] 3,892,956

[45] July 1, 1975

[54] CASCADE DIGITAL FAST FOURIER ANALYZER

[75] Inventor: Peter Siegfried Fuss, Greensboro, N.C.

[73] Assignee: Bell Telephone Laboratories, Incorporated, Murray Hill, N.J.

[22] Filed: Dec. 27, 1971

[21] Appl. No.: 212,572

[52] U.S. Cl. .................................................. 235/156
[51] Int. Cl. ............................................. G06f 15/34
[58] Field of Search ......... 235/156; 324/77 B, 77 G, 324/77 H, 77

[56] References Cited

UNITED STATES PATENTS 3,588,460 6/1971 Smith .................................. 235/156
3,816,729 6/1974 Works .................................. 235/156

*Primary Examiner*—David H. Malzahn
*Attorney, Agent, or Firm*—W. Ryan

[57] ABSTRACT

A single-input-channel cascade FFT processor is described which includes a plurality of cascaded arithmetic units interconnected by delay and switching elements. All components are operated at full capacity without the requirement that the input sequence be reordered in a digits-reversed or other manner.

3 Claims, 7 Drawing Figures

FIG. 2A

FIG. 2

CASCADE DIGITAL FAST FOURIER ANALYZER

GOVERNMENT CONTRACT

The invention herein claimed was made in the course of or under a contract with the Department of the Navy.

This invention relates to signal processing apparatus and methods. More particularly this invention relates to apparatus and methods for generating Fourier series coefficients corresponding to a sequence of input signals. Still more particularly, this invention relates to a digital processor having a plurality of cascaded stages, each capable of generating a sequence of signals corresponding to the Fourier coefficients of selected signals applied at its input.

The well-known fast Fourier transform techniques have been applied to a wide range of signal analysis problems. Particular apparatus and methods for performing the fast Fourier transform have taken many different forms. A recent summary of several of the most popular configurations is presented in "Fast Fourier Transform Hardware Implementations" by G. D. Bergland, IEEE Trans. on Audio and Electroacoustics, Vol. AU-17, June 1969, pp. 104–108. Another useful reference is Cochran et al., "What Is the Fast Fourier Transform," IEEE Trans. Audio and Electroacoustics, June 1967, pp. 45–55. One particular form of fast Fourier transform apparatus which has been found to be of commercial importance is the so-called cascade or pipeline processor, described, for example, in Bergland and Hale, "Digital Real-Time Spectral Analysis," IEEE Trans. Electronic Computers, Vol. EC-16, pp. 180–185, April 1967, and in U.S. Pat. Nos. 3,544,775, issued Dec. 1, 1970 to G. D. Bergland et al., and 3,588,460 issued June 28, 1971 to R. A. Smith.

Other useful references dealing with the so-called cascade or pipeline fast Fourier transform processor include Groginsky and Works, "A Pipeline Fast Fourier Transform," 1969 IEEE Eascon Rec., pp. 22–29; and O'Leary, "Nonrecursive Digital Filtering Using Cascade Fast Fourier Transformers," IEEE Trans. on Audio and Electroacoustics, June 1970, pp. 177–183.

The above-cited Smith patent described an improvement to the basic cascaded Fourier processor described, for example, in the Bergland et al patent, supra. Smith found it possible to more fully utilize the apparatus of the Bergland configuration to achieve higher efficiencies under certain circumstances. In particular, it was noted by Smith that not all of the apparatus in the Bergland et al configuration was used at substantially full capacity. By utilizing this spare capacity and by appropriately routing signals, it was shown by Smith that two complete input sequences could be processed with little or no more hardware than was previously required for a single input sequence.

A patent application by the present inventor, Ser. No. 82,572 filed Oct. 21, 1970 and assigned to the assignee of the instant application, now U.S. Pat. No. 3,702,393 issued Nov. 7, 1972, describes a further improvement to previously known cascade fast Fourier transform organizations. In this last-mentioned patent application there is disclosed a cascade processor organized to receive but a single input data stream and to utilize each delay and computational element to its fullest extent. Thus U.S. Pat. No. 3,702,393 presents an improvement over the Smith patent in that, inter alia, two separate input sequences need not be present to achieve the desired 100 efficient operation.

The system described in U.S. Pat. No. 3,702,393 required, however, that the input sequence to be transformed be "scrambled" in accordance with the well-known digits-reversed technique. Thus an additional stage of preprocessing is required in using the otherwise improved cascade FFT processor. The importance of eliminating the need for prescrambling of the input sequence is especially evident when it is desired that overlapped or redundant processing is involved. Thus, while efficient means have been developed for simultaneously prescrambling an input data sequence while providing for Fourier transforming of partially overlapped data records, nevertheless an additional complexity must be tolerated. For a more complete description of methods and apparatus for performing prescrambling in a manner compatible with the FFT processing described in copending application U.S. Pat. No. 3,702,393, see the patent application Ser. No. 211,882 by F. W. Thies filed of even date herewith.

It is therefore an object of the present invention to provide for the simplified generation of Fourier series coefficients. It is a further object of the present invention to provide for simplified cascade fast Fourier transform processing units which utilize the individual computational and storage elements with improved efficiency. It is a further object of the present invention to provide in a digital cascade fast Fourier transform processor for the generation of Fourier series coefficients based on a single input data sequence. It is still a further object of the instant invention to provide for the generation of Fourier series coefficients based on a single input data sequence where the input data sequence is presented in its normal (non-scrambled) order.

SUMMARY OF THE INVENTION

Briefly stated, in accordance with a typical embodiment of the present invention, there is provided a plurality of cascaded computational units of the type described generally in the Bergland et al. and Smith patents, supra. The input to the first stage is arranged to be a bifurcated version of the input sequence for which Fourier series coefficients are desired. Unlike the above-cited U.S. Pat. No. 3,702,393, however, the input streams are not scrambled in digits-reversed order. The bifurcation of the input sequence is conveniently accomplished by a switching arrangement which selects alternately from elements of the first and second half of each input record.

The outputs of the first and subsequent stages are conveniently grouped into subsets by a switching and delay arrangement prior to application to inputs of the succeeding stage. By thus alternating subsets previously forming a single data stream, it is possible to utilize to the fullest extent the storage and computational facilities of each of the ordered stages.

BRIEF DESCRIPTION OF THE DRAWING

These and other features and objects of the present invention will be described in greater detail in connection with an illustrative embodiment of the present invention when read with the accompanying drawing wherein.

DETAILED DESCRIPTION

As should be clear from the introductory remarks above, the instant invention represents an improvement over the systems disclosed in U.S. Pat. Nos. 3,544,775 issued Dec. 1, 1970 to G. D. Bergland et al., and 3,588,460 issued June 28, 1971 to R. A. Smith and that disclosed in U.S. Pat. 3,702,393 by the present inventor. Because of the close proximity, for background and other purposes, these patents and copending patent application are hereby incorporated by reference and should be considered as if set forth herein in their entirety.

Figures 1, 2, 2A, 4:
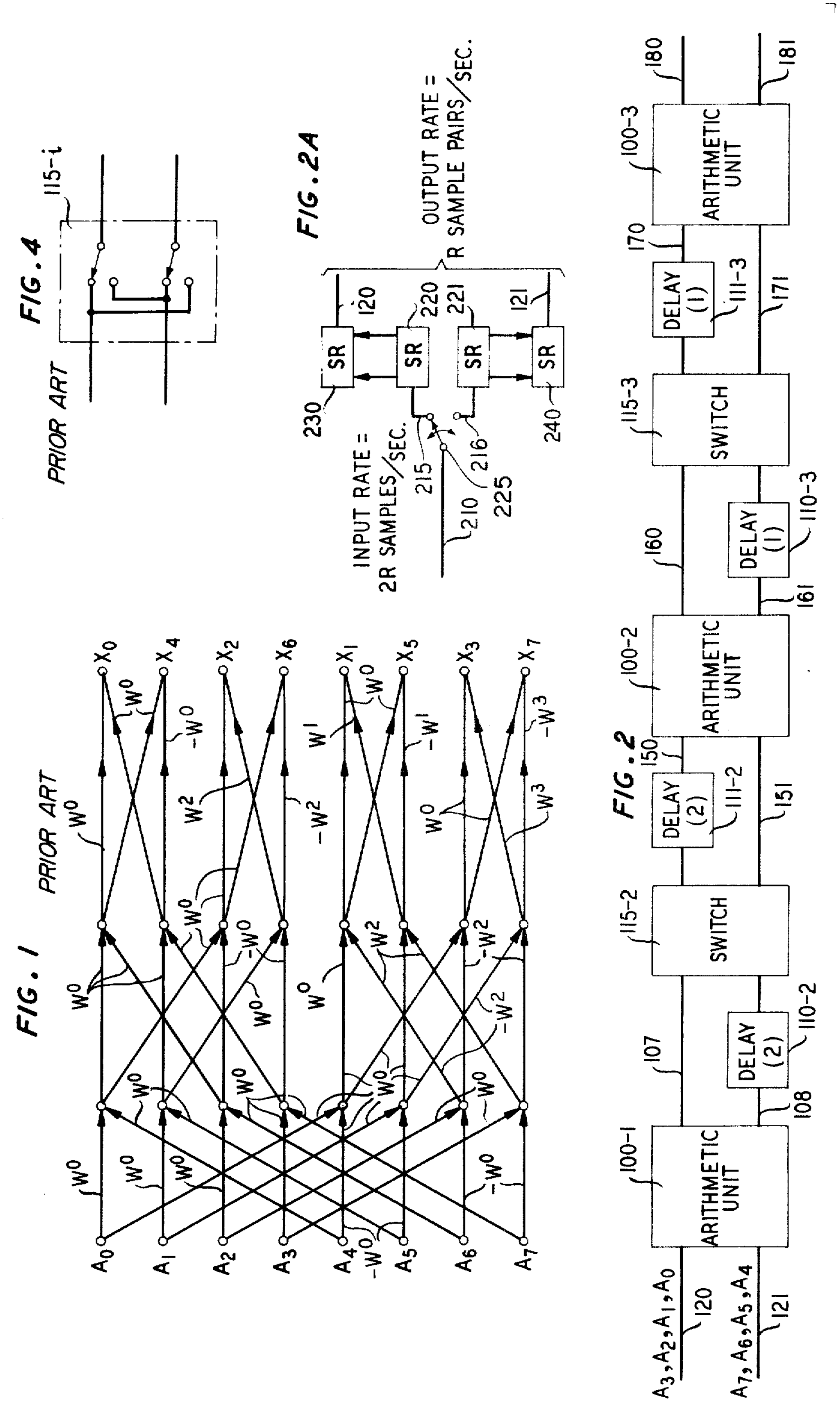
FIG. 1 shows a signal flow diagram illustrating the arithmetic operations performed in calculating the Fourier series coefficients corresponding to an 8-sample record.
FIG. 2 shows the general configuration for one embodiment of the present invention.
FIG. 2A shows a circuit for deriving the input pairs required by the circuit of FIG. 2.
FIG. 4 illustrates a representation of apparatus for performing the switching function required for the circuit of FIG. 2.

FIG. 1 is a signal flow diagram summary of one version of the fast Fourier transform algorithm for an 8-point input sequence. As should be noted at the left of FIG. 1, the input samples are identified by the designation $A_i$, $i$=0,1,2,...,7. It should be understood, of course, that in the general case the number of samples or values in the input sequence may be any number N which may be represented as the product of two integers. For most practical cases thus far realized, however, $N$ has been selected to be an integer power of 2, i.e., $N=2^m$, where $m$ is an integer.

The outputs shown in FIG. 1 at the right represent the Fourier series coefficients corresponding to the input sequence $A_i$. Each of the arrows in the signal flow diagram in FIG. 1 has associated with it a term representing a power of W. It should be understood that, as in the FFT literature generally, $W = \exp(2\pi j/N)$, $j^2 = -1$.

FIG. 2 shows a typical FFT configuration in accordance with the instant invention for performing the fast Fourier transform of the input sequence $A_i$. As is common with FFT processors in the prior art for processing a sequence of $2^m$ samples, there are $m$ stages. Each stage necessarily includes an arithmetic unit represented by the designation **100-*i*, $i$ = 1,2,3 as shown in FIG. 2. Except for the first stage which will be discussed in more detail below, each stage includes a pair of delay units 110-*i* and 111-*i*, $i$ = 2,3. Finally, each stage includes a switch 115-*i***, $i$ = 2,3. As should be clear from the prior art and the interconnection shown in FIG. 2, signals processed by a first stage are selectively delayed and are passed to the immediately succeeding stage.

The input sequence to the first stage for the case of an 8-sample input sequence is, as shown in FIG. 2, bifurcated into two subsequences. Thus the first 4 samples $A_0$-$A_3$ appear on the top input lead 120 to arithmetic unit 100-1, while the last 4 input samples $A_4$-$A_7$ appear on the lower input lead 121 to arithmetic unit 100-1. As in the system described in U.S. patent 3,702,393, these 4-sample subsequences are presented to arithmetic unit 100-1 in synchronized pairs. In the system of FIG. 2 this pairing is such that $A_0$ and $A_4$ are presented simultaneously, as are $A_1$ and $A_5$, etc.

Since arithmetic units **100-*i*** are arranged to operate on signal pairs, the effective input rate may be doubled for a given arithmetic unit as compared to the system described in the Bergland et al patent, supra. Thus, if an input sequence is applied at a rate of 2R samples/sec to an input terminal as shown in FIG. 2A, it is possible to derive the appropriate sample pairs at the output terminals at the rate of R pairs of samples per second.

All that is required is that the samples appearing on input lead 210 in FIG. 2A be alternately switched to leads 215 and 216 for periods of $4/2R = 2/R$ seconds. Thus sequences of 4 samples are alternately entered into one of the shift registers 220 and 221. These are entered in serial form. Shift register 220 is selected first in each 8-sample sequence. After it has received the samples $A_0$-$A_3$, switch 225 connects the input lead 210 to permit the next four samples $A_4$-$A_7$ to be entered into shift register 221. When this is complete, shift registers 220 and 221 are cleared by parallel transferring their contents to respective shift registers 230 and 240. Then these samples are shifted out on leads 120 and 121 at the rate of R sample pairs per second. While this latter shifting is taking place, the shift registers 220 and 221 are filled with new data and the process repeats. Other techniques and apparatus for deriving signal pairs and/or buffering may, of course, be used where appropriate.

Figure 3:
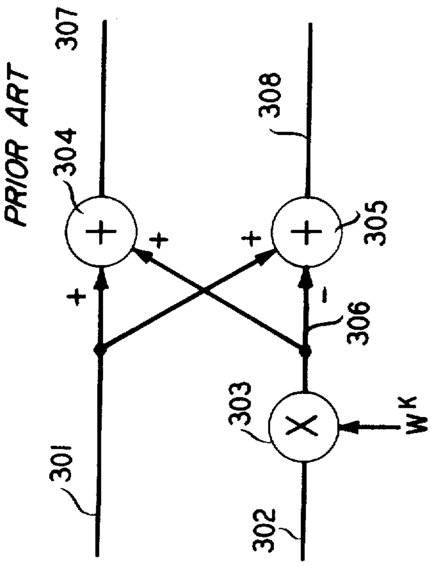
FIG. 3 is a representation of a prior art arithmetic unit for use in connection with the circuit of FIG. 2.

FIG. 3 shows the familiar "butterfly" configuration for performing the complex arithmetic operations implied by the signal flowchart in FIG. 1. In particular, the circuit of FIG. 3 is shown to receive on input lines 301 and 302 corresponding complex-valued signals. It should be understood, of course, that for some cases at least, the signals applied on leads 301 and 302 may, in part or whole, be signals representing numbers having only a real part, i.e., the values may be real values.

In any event, the lower input signal appearing on lead 302 is operated on by multiplier 303 to form on lead 306 a signal representing the complex product of the input signal on lead 302 with the appropriate complex phasor signal $W^k = \exp(2\pi jk/N) = \exp(j\phi)$. The resulting product from multiplier 303 is then applied to both of the adders 304 and 305. In the adder 304 the complex algebraic sum of the signal appearing on lead 301 with the product formed on lead 306 is formed and delivered on lead 307. Similarly, the complex algebraic difference between the signal appearing on lead 301 and that appearing on lead 306 is formed at adder 305 and supplied to lead 308.

Figure 5:
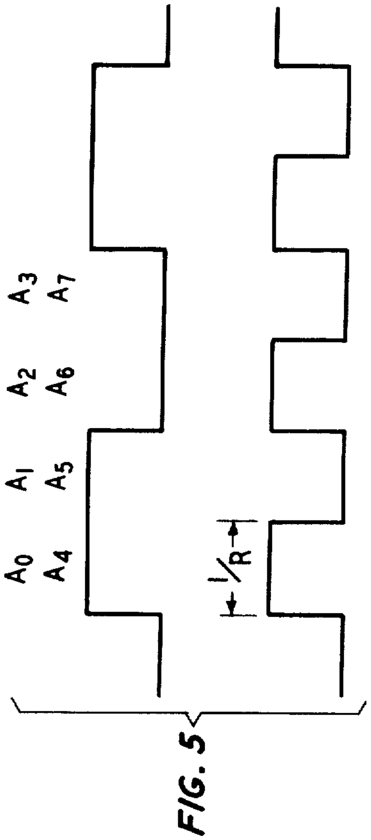
FIG. 5 depicts waveforms illustrating the position of the switches shown in the cascaded arrangement of FIG. 2.

In the case of the first stage in the circuit of FIG. 2, the output leads 307 and 308 correspond respectively to the output leads 107 and 108 from arithmetic unit 100-1. The complex results appearing on lead 107 are delivered directly to switch 115-2, as shown in FIG. 2. The signals appearing on lead 108, on the other hand, are caused to be passed through a delay unit 110-2 having a delay equal to two input sample pairs. Switch 115-2, which may assume the form shown in FIG. 4, is caused to alternate between its upper position and its lower position in a manner prescribed by a control signal of the form shown by the upper waveform in FIG. 5. Thus during the period that input sample pairs $A_0$ and $A_4$, and $A_1$ and $A_5$ are applied at the input terminals 120 and 121, switch 115-2 is arranged to be in its upper position. During the period that sample pairs $A_2$ and $A_6$, and $A_3$ and $A_7$ are applied on input leads 120 and 121, switch 115-2 is in its lower position. In FIG. 5, the upper (high) value for the waveforms indicates that the upper position for switch 115-i is achieved and a low value indicates the lower position for switch 115-i. The effect of alternating the position of switch 115-2 in the manner illustrated is to cause successive pairs of results appearing on leads 107 and 108 in FIG. 2 to experience variable delays by having either the upper one of the pair pass through delay unit 111-2 or to pass directly to input lead 151 to arithmetic unit 100-2.

In arithmetic unit 100-2 the signals appearing in pairs on lead 150 and 151 are operated on in the same manner as were the inputs to complex arithmetic unit 100-1. The output leads from arithmetic unit 100-2 appear on leads 160 and 161. The process of delaying and selecting is then repeated by delay units 110-3 and 111-3 and switch 115-3. However, the delays are of a duration equal to one input sample pair. Further, the switch 115-3 is alternated between its upper and lower position at the rate of R times per second, as indicated by the lower waveform in FIG. 5.

The result of the selective delaying by delay units 110-3 and 111-3 is to present sample pairs on the input leads 170 and 171 to arithmetic unit 100-3. In arithmetic unit 100-3 the arithmetic operations performed in the previous arithmetic units are repeated, the operands being the signals appearing on leads 170 and 171. The output signals appearing on leads 180 and 181 are the desired Fourier coefficients for the input sequence $A_i$ presented on leads 120 and 121.

As can be seen from the above description and a detailed tracing of signal pairs through the circuit of FIG. 2, and by referring to the above-cited U.S. Pat. No. 3,702,393, after an initial start-up period, each complex arithmetic unit **100-*i* in FIG. 2 is effective during each input sample pair period to generate corresponding output pairs on its output leads. Similarly, delay units 100-*i* and 111-*i* store data at all times. That is, there is no period during which arithmetic units 100-*i* and delay units 110-*i* and 111-*i*** are inactive or operating at less than their designed capacity. In short, the circuit of FIG. 2 is 100 percent efficient in the use of hardware elements. Unlike the circuits appearing in U.S. Pat. No. 3,544,775 and elsewhere there is not required waiting for an input to be supplied at an input terminal to a multiplier or adder; the data are presented at the appropriate input terminals at precisely the time that the unit (arithmetic or delay) is prepared to operate on them. Further, unlike the system described in U.S. patent No. 3,588,460, it is not required that two independent data sequences be provided at the input terminals. Finally, unlike the system described in U.S. Pat. No. 3,702,393 by the instant inventor, no prescrambling of the input data sequence in digits-reversed order is required.

Figure 6:
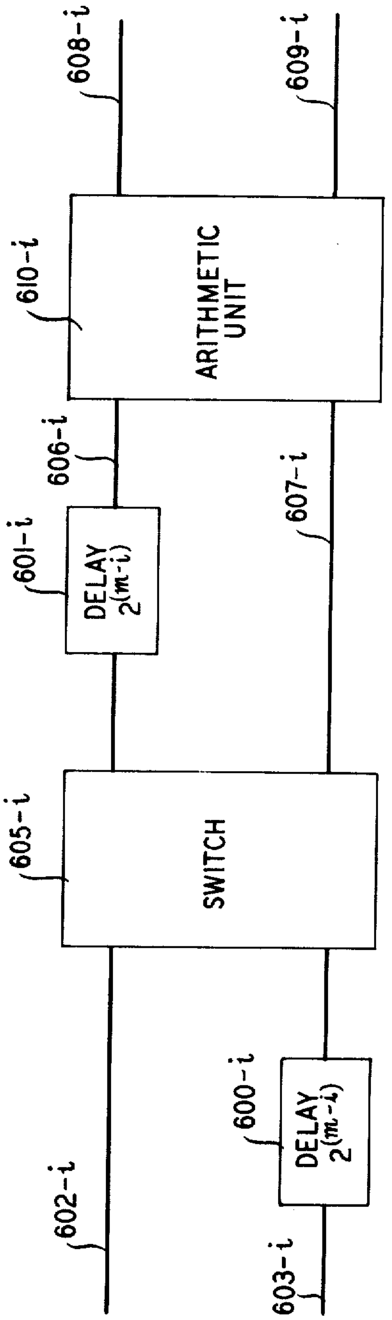
FIG. 6 is a generalized stage for a cascade fast Fourier transform processor in accordance with the instant invention.

Although the above-described illustrative embodiment was effective to perform the fast Fourier transform of a data sequence including 8 samples, it should be clear from prior teachings that the configuration shown in FIG. 2 may be adapted to accommodate processing of sequences of signals of any length, N, where $N = 2^m$. All that need be supplied are $m$ stages of the type shown in FIG. 2. FIG. 6 shows the generalized configuration for a 100 percent efficient cascade FFT processor for an arbitrary value of $m$.

The overall configuration of the generalized stage of FIG. 6 is at once apparent. Thus a pair of delay units **600-*i* and 601-*i* are effective for delaying signals impressed on leads 602-*i* and 603-*i* under the control of double pole switch 605-*i* to generate selectively delayed pairs of signals on leads 606-*i* and 607-*i*. These pairs of signals are then operated on in the above-described fashion to produce corresponding output signals on leads 608-*i* and 609-*i*. The complex arithmetic unit is represented in FIG. 6 by the designation 610-*i*. At the ith stage, delay units 600-*i* and 601-*i* provide a delay equal to $2^{(m-i)}$. Similarly, switch 605-i** is in its upper and lower position for alternate ones of $2^{(m-i)}$ input sample pairs.

The first stage of any cascade processor in accordance with the present invention may be degenerate in the same sense as the first stage of the circuit of FIG. 2, i.e., it need not include delay units such as **600-*i* and 601-*i*, nor a switch 605-i** as shown in FIG. 6. Further it is clear that a sufficiently fast arithmetic unit may be timeshared between a plurality of stages in the manner described in U.S. Patent 3,702,393.

It should be recognized that, because no prescrambling was effected prior to processing in accordance with the instant teachings, the output results (e.g., $x_i$ in FIG. 1) appears in digits reversed order. While this may be a disadvantage for some applications, it is often found to be simpler to perform an "unscrambling" at the output of a processor than at the input, especially when record overlap is incorporated as described in the above-cited patent application by F. W. Thies. Further, some configurations advantageously employ the scrambled results to represent an input for subsequent FFT processing. See O'Leary, "Nonrecursive Digital Filtering Using Cascade Fast Fourier Transformers," IEEE Trans. on Audio Electroacoustics, June 1970, pp. 177–183.

The techniques for adapting an FFT processor to perform processing for a plurality of input channels disclosed in the above-cited U.S. Pat. No. 3,702,393, may also be used in connection with the presently disclosed embodiments.

Other modifications and extensions within the spirit and scope of the appended claims will occur to those skilled in the art.

What is claimed is:

1. A fast Fourier transform processor for forming Fourier coefficient signals corresponding to consecutive N-sample records of a single sequence of ordered input samples, each sample appearing during a respective consecutive fixed 1/2R-second interval of time, R being a constant value, comprising a plurality of ordered cascaded processing stages A. the first of which stages comprises 1. an arithmetic unit having first and second input terminals and first and second output terminals for generating at said output terminals during successive fixed 1/R-second intervals of time pairs of output signals representing the sum and difference of a first product signal and a signal applied at said first input terminal, said first product signal representing the product of a signal applied at said second input terminal and a predetermined weighting factor, and 2. means for applying, during 2M consecutive ones of said fixed 1/R-second intervals of time, M > N/2 successive pairs of said input samples of consecutive N-sample records of said single sequence to said first and second input terminals during said successive fixed intervals of time while excluding other signals from said input terminals, said pairs each including a selected sample from the first half of one of said N-sample records of input samples and a uniquely corresponding sample from the second half of said one of said N-sample records of input samples, B. each stage after the first comprising 1. a pair of input terminals,
2. a pair of output terminals,
3. a network for selectively delaying signals applied at said input terminals,
4. arithmetic means for forming output pairs of signals corresponding to the sum and difference of a second product signal and a signal applied at said pair of input terminals and selectively delayed by said network, said second product signal representing the product of a predetermined weighting factor and another signal applied at said pair of input terminals and selectively delayed by said network.

2. The processor of claim 1 wherein said network comprises first and second serial delay means and a switch for selectively connecting said delay means between said input terminals and said arithmetic means.

3. The processor of claim 2 wherein at the ith of said stages, $i = 2, 3, \ldots, m$, $m = \log_2 N$, said first and second delay means each comprises means for delaying selected output signals from the $(i - 1)$th stage by an amount equal to $2^{m-i}$ sample pairs.

* * * * *